United States Patent [19]
Daugherty

[11] Patent Number: 5,948,258
[45] Date of Patent: Sep. 7, 1999

[54] WASTE WATER SETTLING APPARATUS AND METHOD

[76] Inventor: Thomas C. Daugherty, 705 Wyncroft Ter., #6, Lancaster, Pa. 17603

[21] Appl. No.: 08/794,609

[22] Filed: Feb. 3, 1997

[51] Int. Cl.$^6$ .................................................. B01D 21/28
[52] U.S. Cl. .......................... 210/513; 210/208; 210/533; 209/446
[58] Field of Search ..................... 210/208, 388, 210/513, 521, 522, 748, 785, 800, 532.1, 533; 209/446

[56] References Cited

U.S. PATENT DOCUMENTS

| | | |
|---|---|---|
| 2,077,476 | 4/1937 | Haultain . |
| 3,146,080 | 8/1964 | Ruble et al. ............................... 55/302 |
| 3,463,727 | 8/1969 | Fahey . |
| 3,486,309 | 12/1969 | Wild ......................................... 55/302 |
| 3,628,667 | 12/1971 | Somers et al. . |
| 3,893,921 | 7/1975 | Walther et al. . |
| 3,997,436 | 12/1976 | Stoev et al. . |
| 4,055,491 | 10/1977 | Porath-Furedi . |
| 4,152,255 | 5/1979 | Musschoot . |
| 4,289,630 | 9/1981 | Schmidt, Jr. et al. . |
| 4,424,129 | 1/1984 | Bunger . |
| 4,445,913 | 5/1984 | Nishiyama ................................ 55/302 |
| 4,637,473 | 1/1987 | Gillis et al. ............................... 55/302 |
| 4,655,806 | 4/1987 | Bowersoy ................................. 55/302 |
| 4,913,807 | 4/1990 | Hendricks . |
| 5,282,982 | 2/1994 | Wells . |

*Primary Examiner*—Robert J. Popovics
*Attorney, Agent, or Firm*—Watson Cole Grindle Watson, P.L.L.C.

[57] ABSTRACT

A waste water settling apparatus includes a closed cylindrical vessel supported on and vertically extending above a base, two vertical vibrators joined to the closed vessel for vibrating the vessel, and a drive spring assembly joined between the vibrators and the vessel for multiplying the vertical force of the vibrators. The closed cylindrical vessel includes a rotary valve joined to the lower portion of the vessel for discharging densified solids settled out of the waste water.

16 Claims, 15 Drawing Sheets

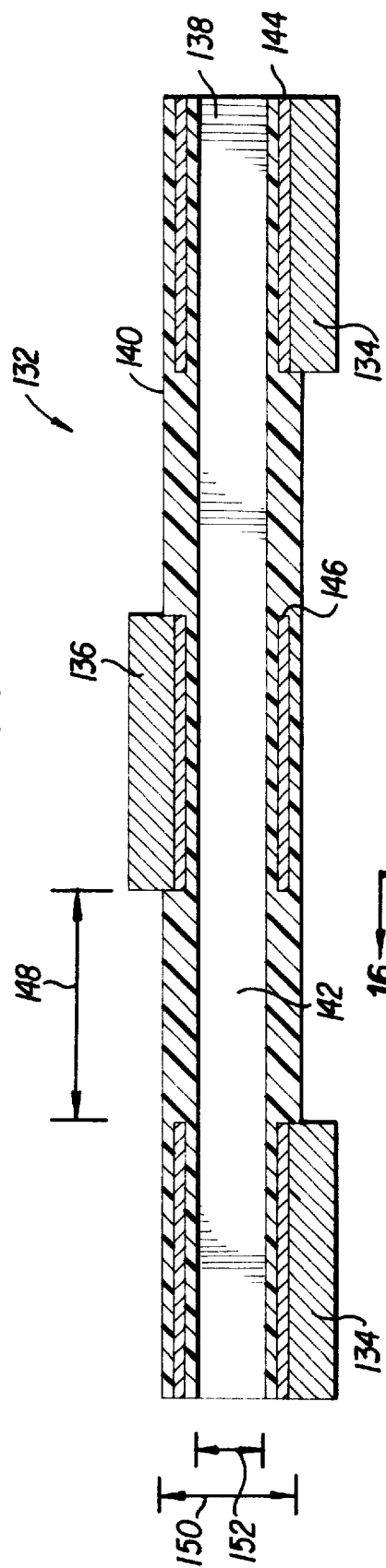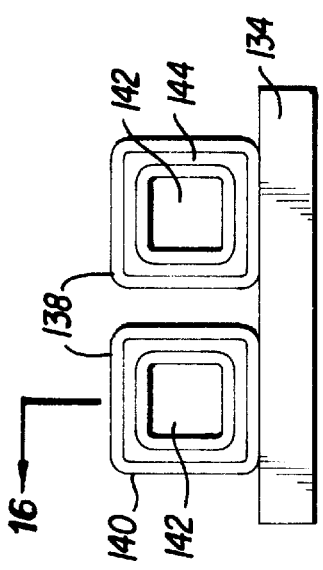

WASTE WATER SETTLING APPARATUS AND METHOD

FIELD OF THE INVENTION

The invention relates to waste water settling devices for clarifying waste water by removing suspended solids from the water and related methods.

BACKGROUND OF THE INVENTION

Aggregate is used in many industries for various applications. Typically the aggregate is stored without regard to its cleanliness. Prior to its use, the aggregate must be cleaned of all the accumulated rock dust and other contaminents. This is readily accomplished by spraying the aggregate with water. In order to reduce the cost associated with cleaning aggregate, the waste water is recycled. In addition, water must be clear and non-turbid before discharge into any waterway. The main goal of recycling is to remove the solids suspended in the waste water.

Waste water settling technology is used in other mining industries and various types of industrial applications where process water is used ranging from food processing to gas manufacture to steel making. The waste water settling apparatus and method are equally applicable to these industries as well as municipal waste water treatment.

Conventional waste water settling processes are used to remove the solid content from the water so the water can be reused or discharged safely and removed solids can be disposed of properly. Conventional devices or methods use a clarifier in combination with a belt press or filter to remove the solids from the water or a settling pond.

A clarifier is a large holding tank. Waste water is fed into the tank and a chemical flocculent is added. The flocculent causes the solid particles to adhere to one another forming larger particles. These larger particles settle on the bottom of the clarifier. Water above the settled particles is discharged or recycled. Solids accumulated in the bottom of the clarifier are fed to a belt press or filter.

Belt presses include one or more endless belts fed between pairs of rollers. Sludge from a clarifier is fed between the belts. The belts carry the sludge through pairs of rollers. The rollers extract water and collect solids between the belts. Filters work in much the same way as a belt press. Water is passed though the filter and solids are captured for disposal.

Both conventional belt presses and filters are costly to operate and require frequent maintenance. The filters and the belts in the press need to be replaced periodically. Also, the cost of the belt presses and filter assemblies are extremely high. Belt presses frequently require a full time operator because of the frequent adjustments and high maintenance requirements. Filters require periodic back washes to clean the filters resulting in noncontinuous operation.

Another approach for settling solids out of waste water involves the use of large settling ponds. Settling ponds usually cover a large area, thus requiring a significant cost in land. Typical settling ponds may be 10 to 20 acres in size.

Waste water is fed into the pond through an inlet located at one end and recyclable water is removed from a discharge outlet at the other end. The water fed into the pond slowly flows from the intake to the outlet. As the water flows to the outlet, the difference in the specific gravity between the water and the suspended solids causes the suspended solids to settle gradually to the bottom of the pond. Larger particles settle rapidly while the smaller particles take longer to settle to the bottom of the pond. Due to the difference in settling times as the water gradually flows from the inlet to the outlet, the composition of particles along the bottom of the pond is non-uniform. Larger particles settle out quickly near the intake, while smaller particles settle more slowly with the smallest settling near the outlet. Accumulated solids are typically dredged from the bottom of the pond using a drag line. This method of recovering the solids leaves the solids with a high moisture content. High moisture content increases the weight of the solids requiring high transportation costs for disposal. In addition, the non-uniform composition of the settled solids decreases their value for other applications.

SUMMARY OF THE INVENTION

The invention is an improved waste water settling apparatus and method. A vibrator drive vibrates a closed vessel in a vertical direction through a drive spring assembly to amplify the vertical vibrations generated by the drive and impart a vertical vibrating force to the closed vessel. The vertical force acting on the closed vessel causes the solid particles in the waste water to collect on the bottom of the vessel and water to flow to the top of the vessel.

The vibrator vibrates the vessel alternately between a downward vertical direction and an upward vertical direction. This vibration of the vessel allows the accumulated solid particles to rearrange themselves slightly during each cycle as the solids settle and displace water. Minuscule channels are created in the accumulated solids in which the water flows upward during compaction. Compaction occurs during the stroke reversal at the bottom point of travel of the vessel and its contents.

The closed vessel includes a lower discharge outlet with a rotary valve for discharge of the densified solids. The rotary valve collects and discharges solid particles as they are compressed without appreciable discharge of water. Regular disposal of the densified solids through the valve allows continuous operation of the settling apparatus. Clarified water is discharged at the top of the vessel.

The lack of filters or belts allows the settling apparatus to be operated continuously without the need to stop and replace or backwash filters or belts. The rapid settling, compared to settling ponds, due to the increased vertical force acting on the solids speeds the rate of recycling of waste water. The compact size of the settling apparatus allows its installation and operation, in a relatively small space. The simplified construction of the apparatus reduces maintenance.

Other objects and features of the invention will become apparent as the description proceeds, especially when taken in conjunction with the accompanying drawings illustrating the invention, of which there are 15 sheets and two embodiments.

DESCRIPTION OF THE DRAWINGS

FIGS. 15 and 16 are enlarged views of a spring unit according to a second embodiment.

DESCRIPTION OF THE PREFERRED EMBODIMENTS

Figure 1:
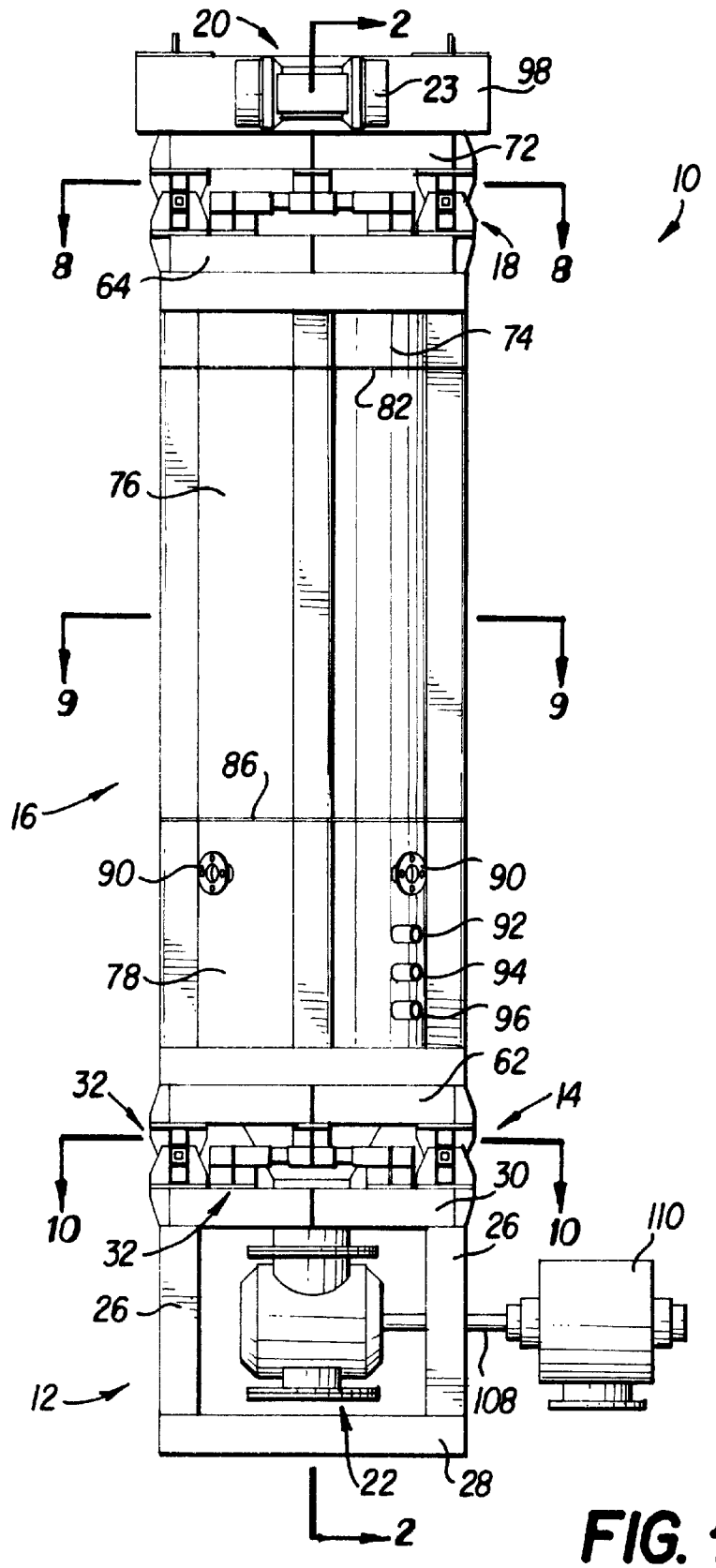
FIG. 1 is a side view of a waste water settling apparatus according to the invention.
Figure 2:
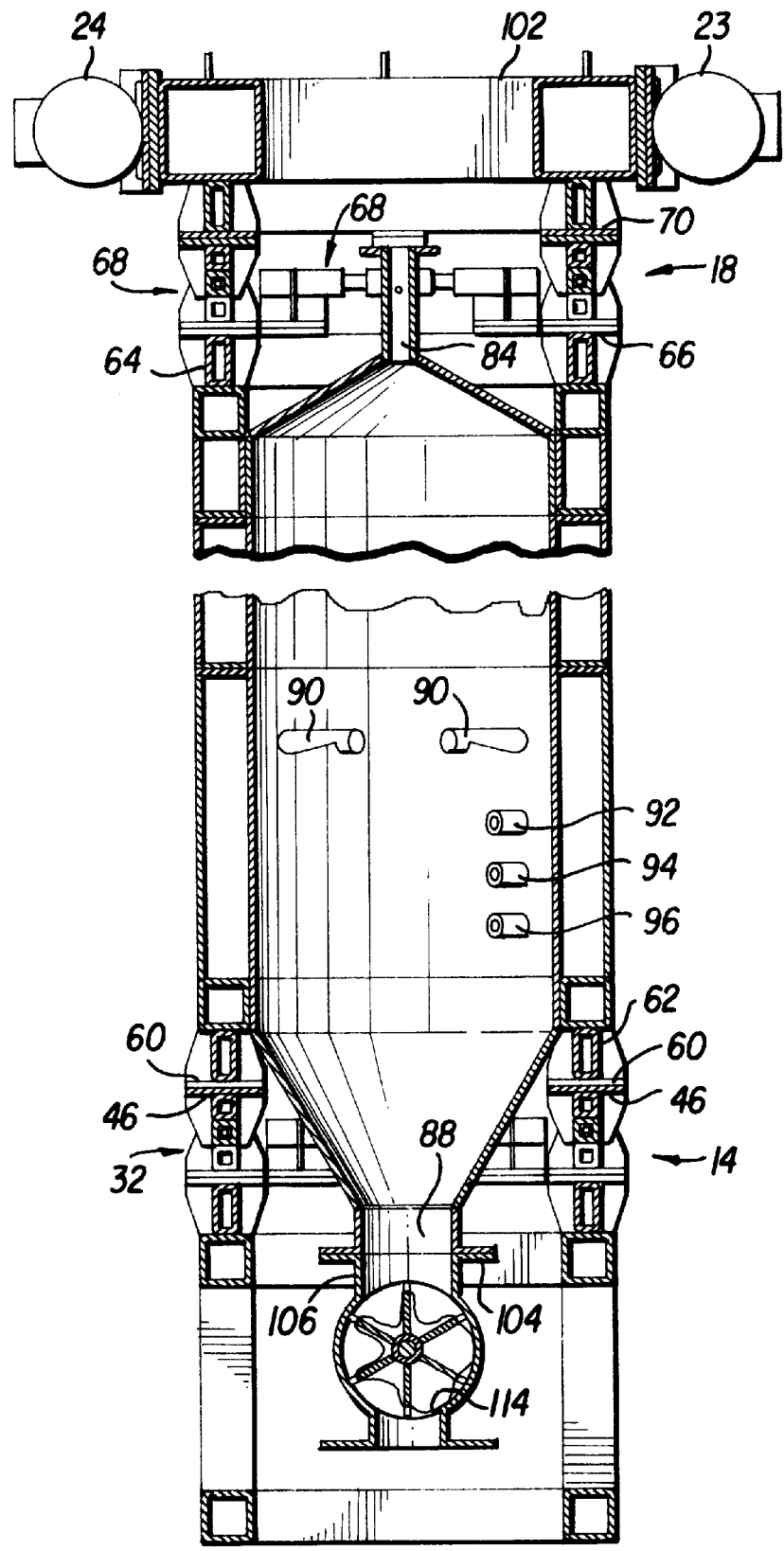
FIG. 2 is a sectional view of the waste water settling apparatus taken along line 2—2 of FIG. 1.
Figure 3:
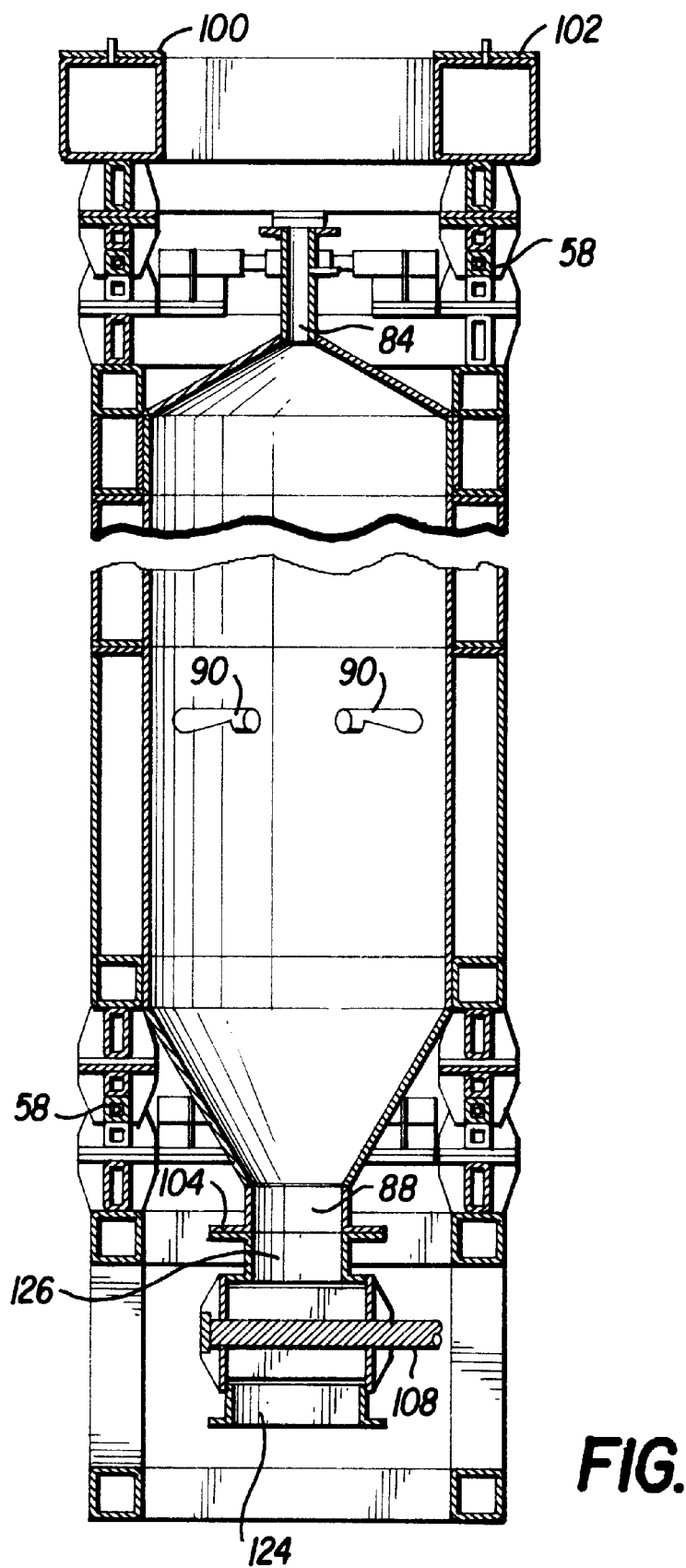
FIG. 3 is a sectional view of the waste water settling apparatus similar to FIG. 2 taken at a right angle to lines 2—2.
Figure 4:
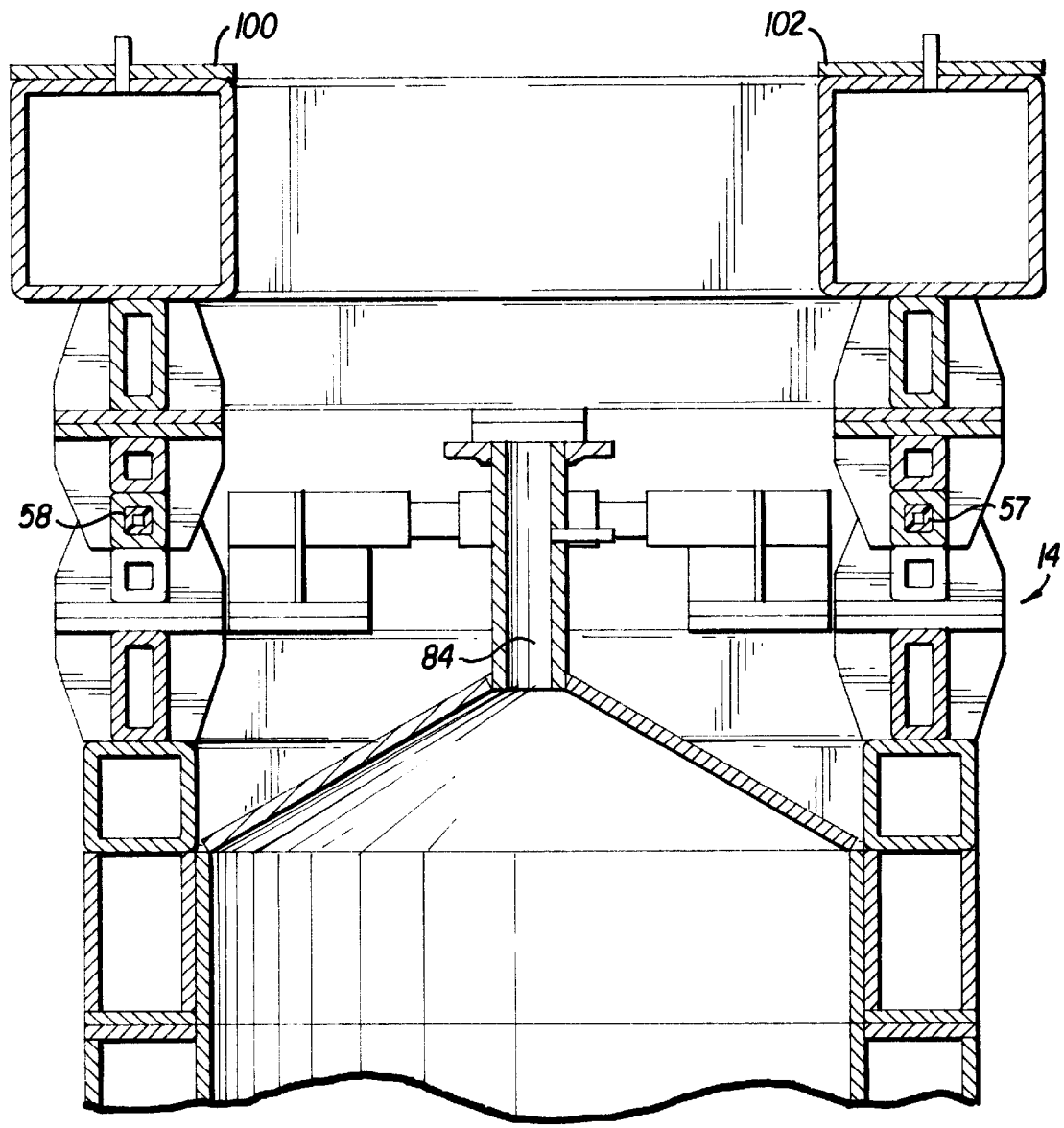
FIGS. 4 and 5 are enlarged views of the upper portion of the apparatus.
Figure 5:
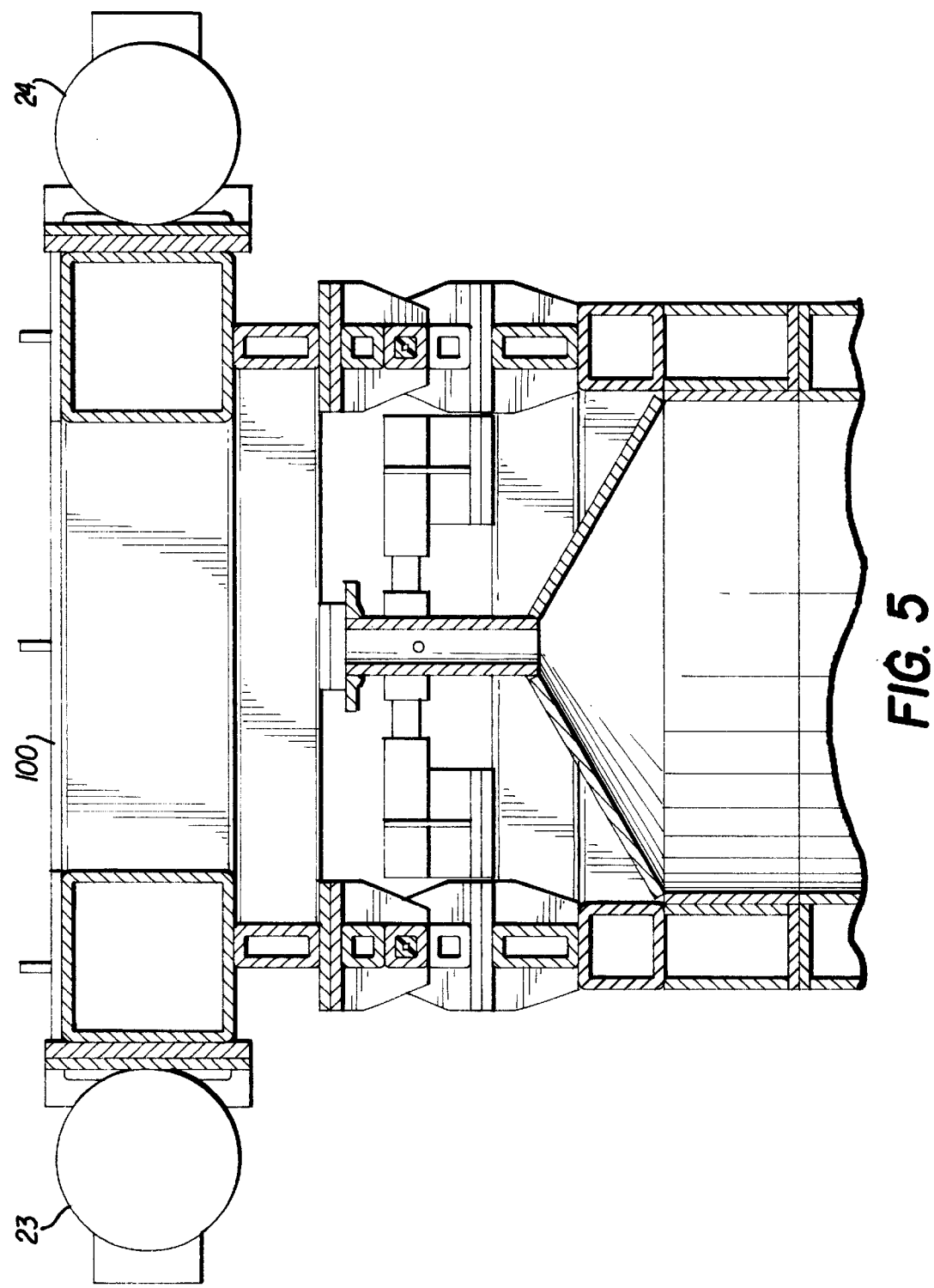
Figure 6:
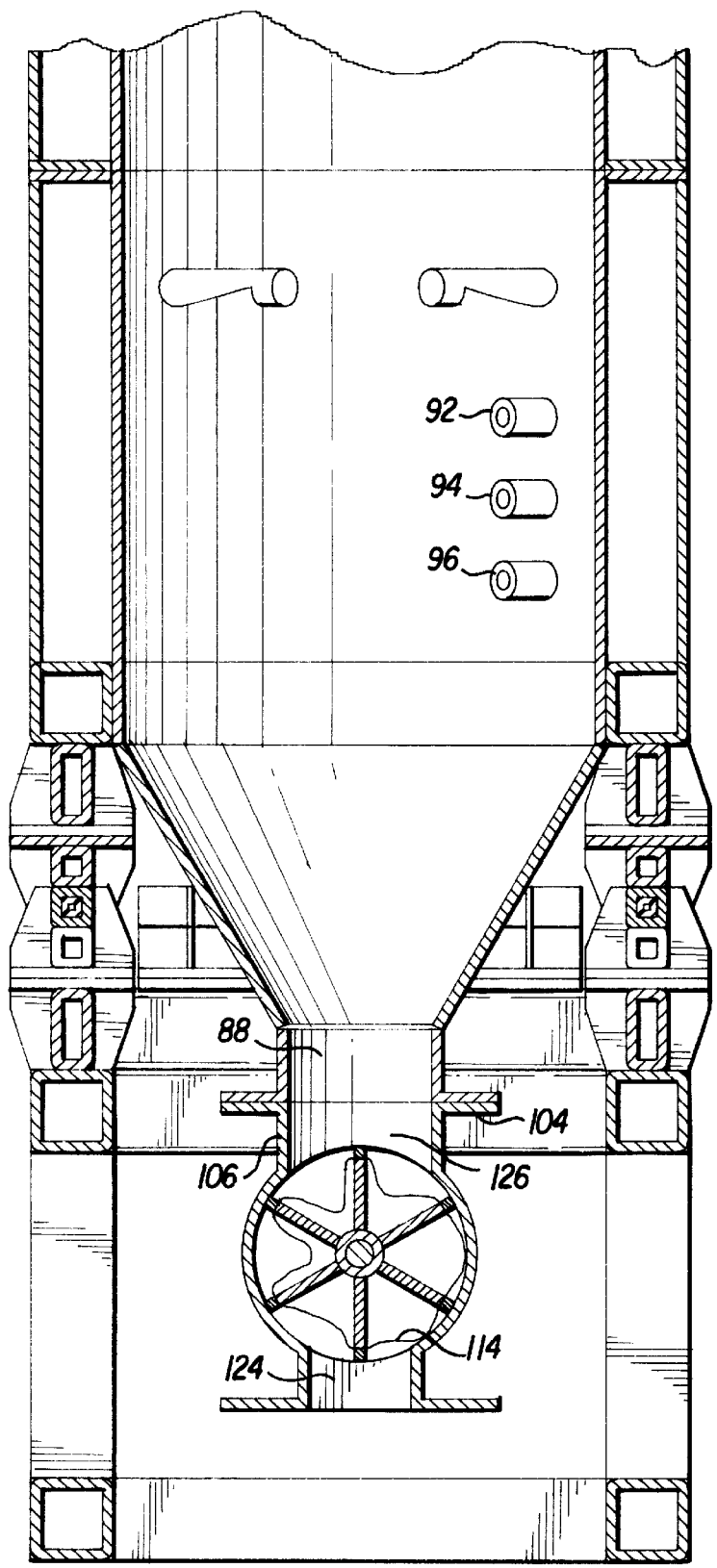
FIGS. 6 and 7 are enlarged views of a lower portion of the apparatus.
Figure 7:
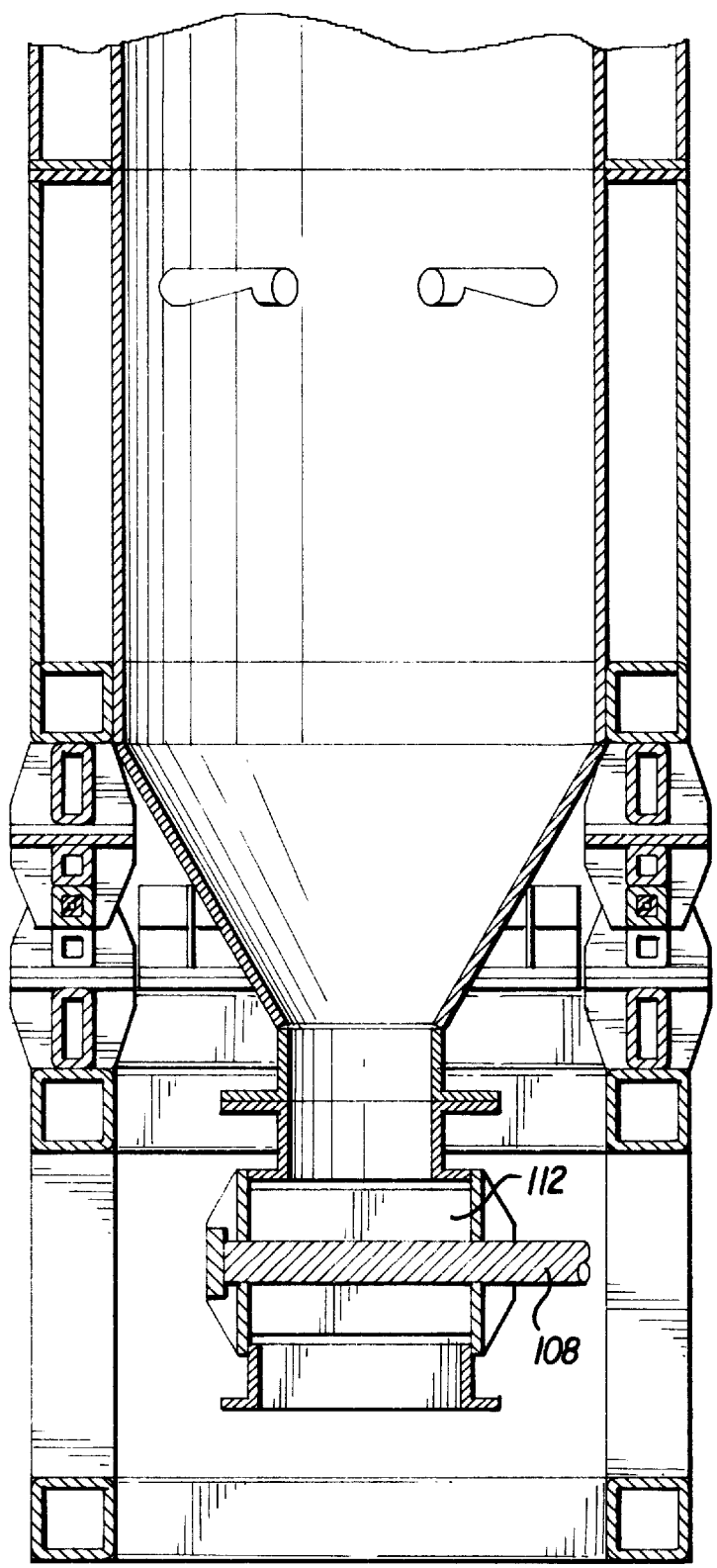
Figure 8:
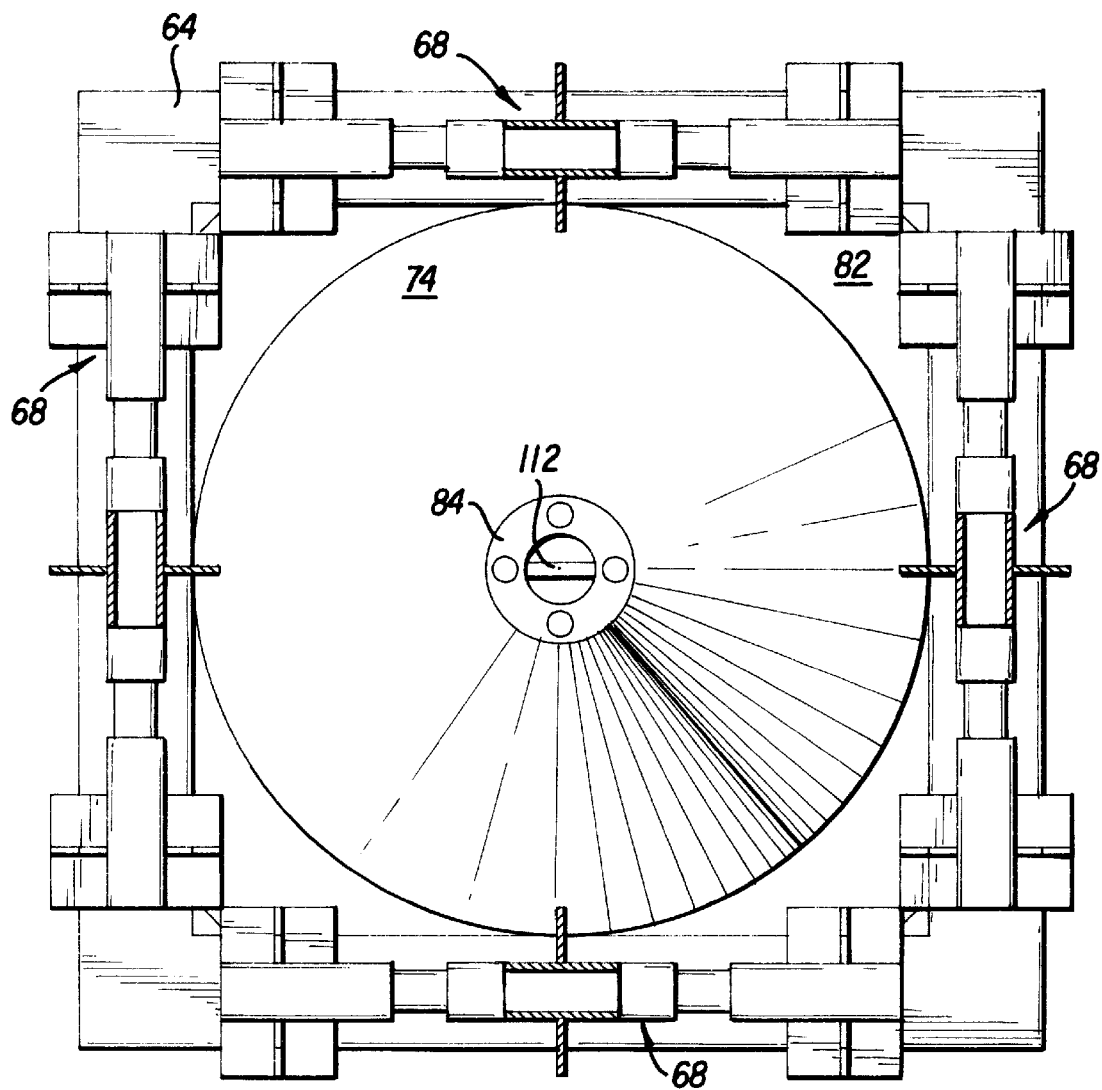
FIG. 8 is a top sectional view of the apparatus taken along line 8—8 of FIG. 1.
Figure 9:
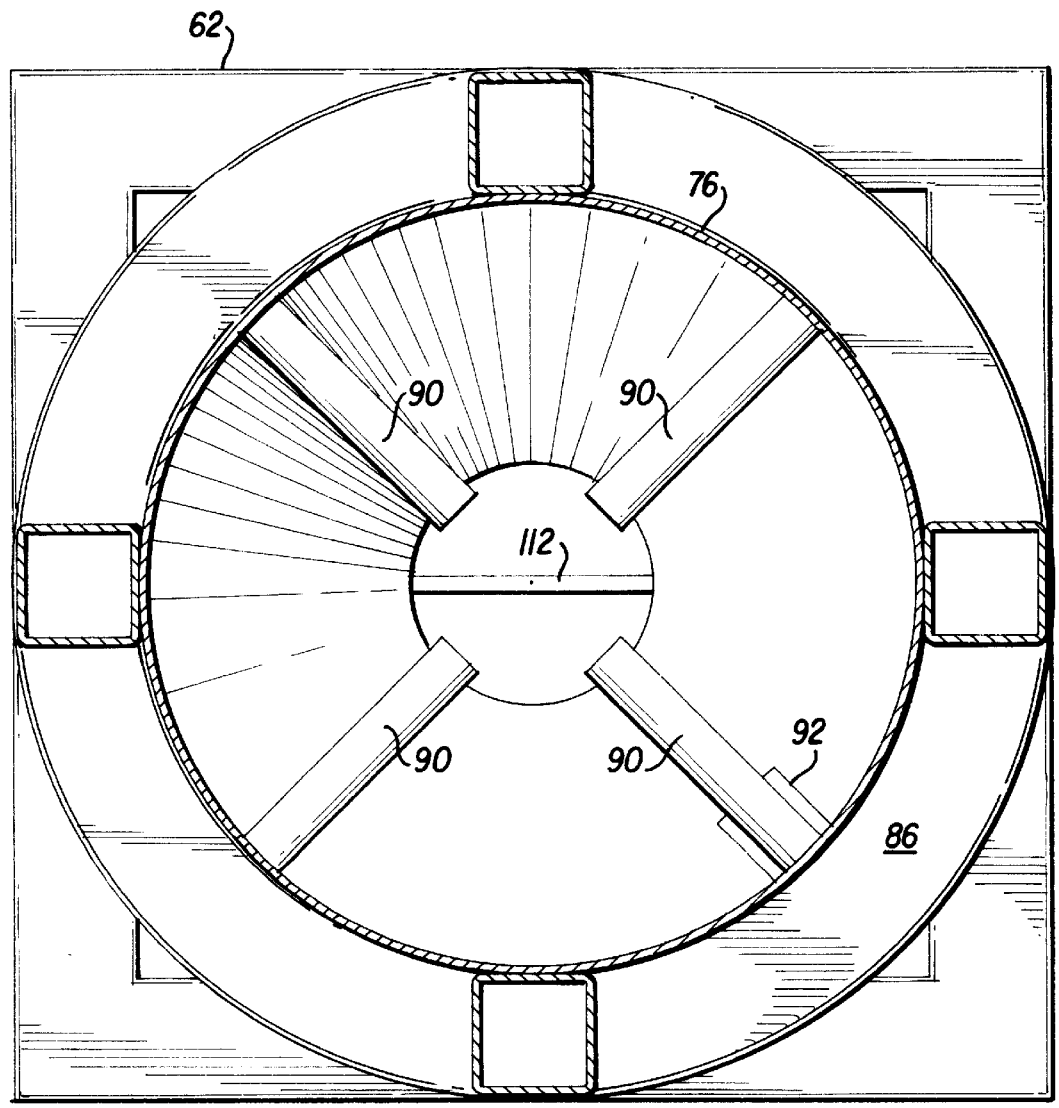
FIG. 9 is a top sectional view of the apparatus taken along the line of 9—9 of FIG. 1.
Figure 10:
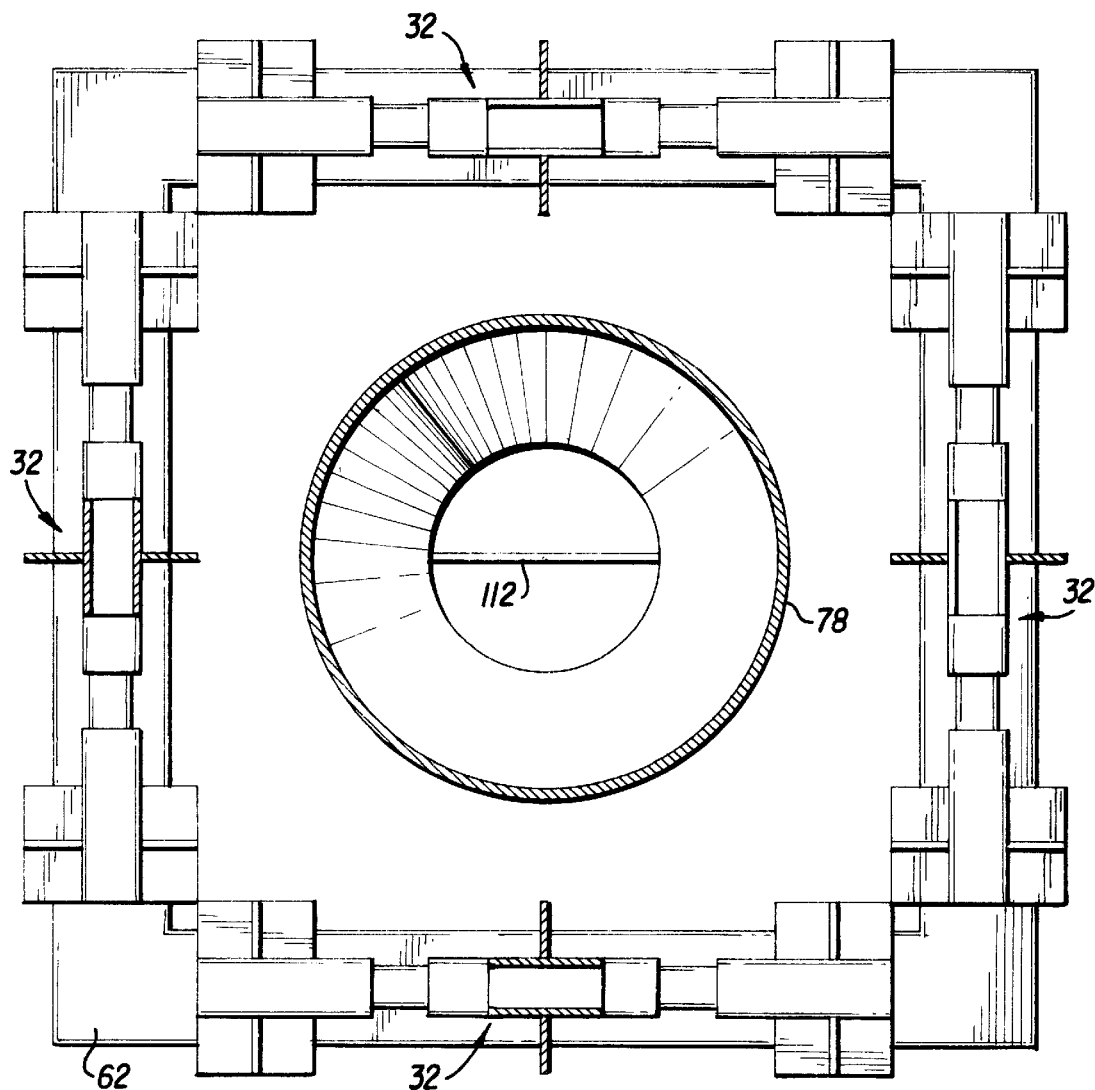
FIG. 10 is a top sectional view of the apparatus taken along line 10—10 of FIG. 1.

Waste water settling apparatus 10 includes a base 12, an isolation spring assembly 14 mounted on top of base 12, a closed cylindrical vessel 16 supported by and extending vertically above isolation spring assembly 14, a drive spring assembly 18 joined to the top of vessel 16, a vibrator drive 20 mounted on and above the drive spring assembly 18 and a rotary discharge valve 22 on the bottom of vessel 16. Vibrator drive 20 includes two rotary vibrators 23 and 24.

Base 12 surrounds valve 22 and includes four short vertical posts 26 extending between the corners of square lower frame 28 and square upper frame 30. Posts 26 are preferably square tubes. Lower frame 28 preferably includes four square horizontal tubes joined at their ends with an open center. Upper frame 30 includes four square horizontal tubes and four rectangular horizontal tubes mounted on top of the square tubes. The tubes are joined at their ends forming two squares with open centers. The bottom of vessel 16 extends through the center of upper frame 30.

Figure 12:
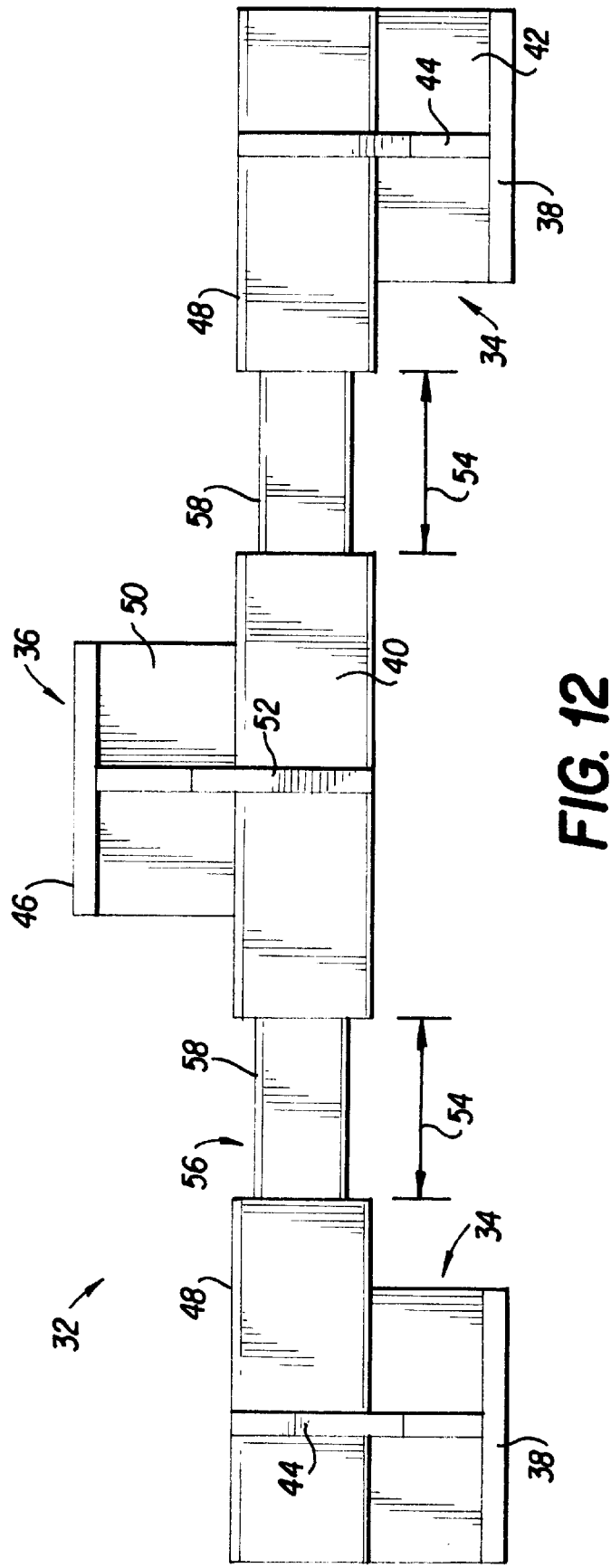
FIGS. 12–14 are enlarged views of a spring unit according to a first embodiment.
Figure 13:
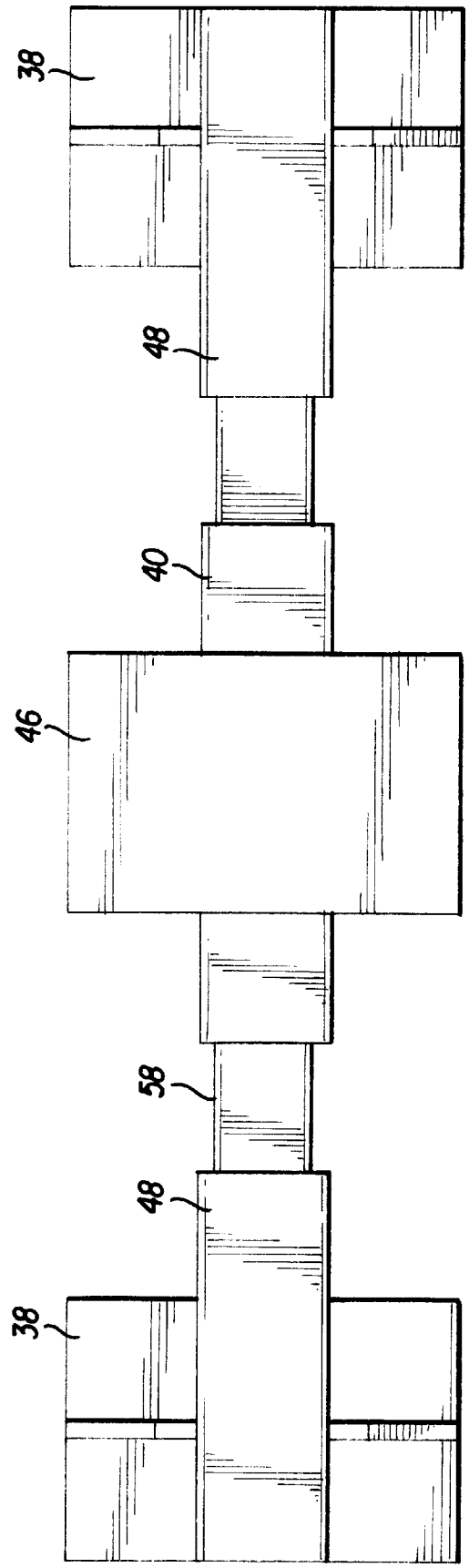
Figure 14:
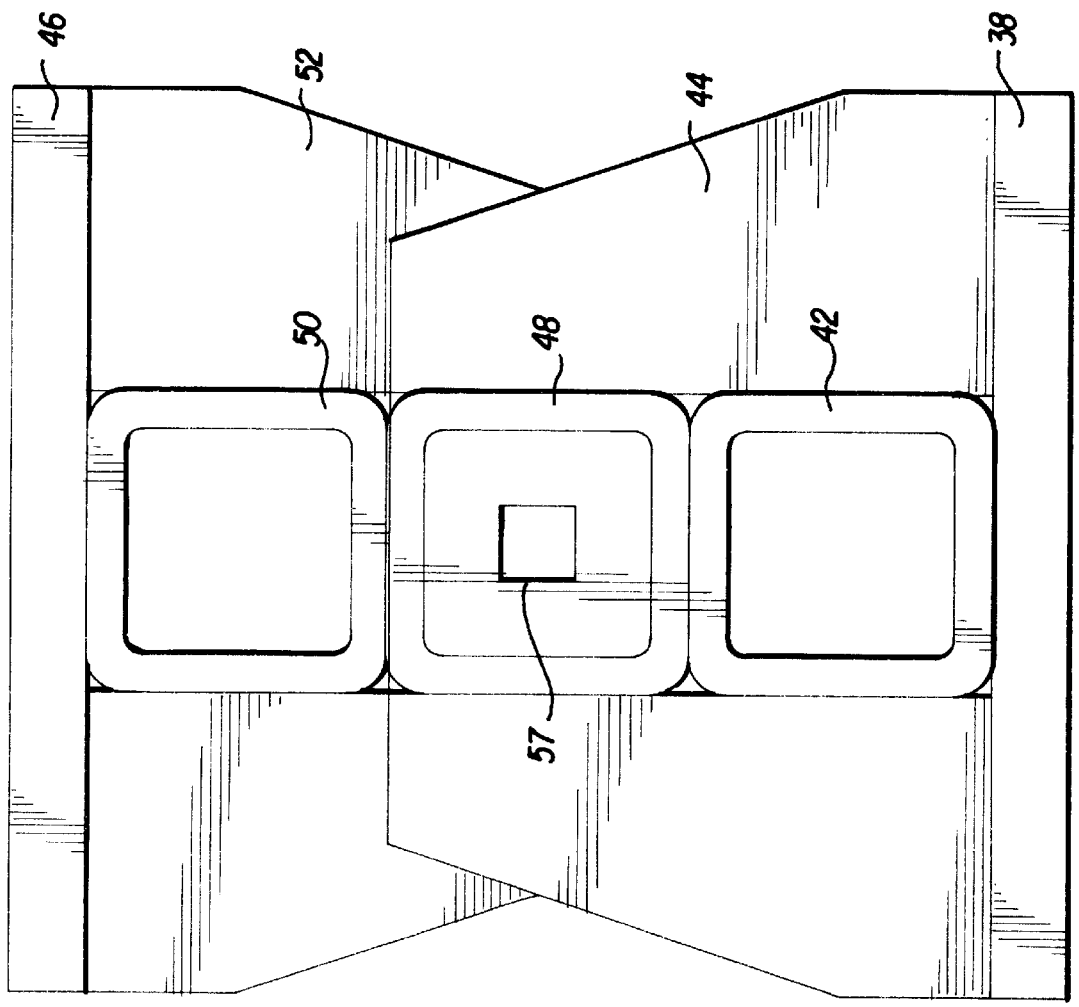

Isolation spring assembly 14 includes four isolation spring units 32 each mounted above one side of upper frame 30 and extending between adjacent corners. As shown in FIG. 12, each spring unit 32 according to a first embodiment includes a pair of spaced apart end spring supports 34 and a central spring support 36 located between supports 34. Each support 34 includes a lower mounting pad 38 which rests flush on the end of one side of the top frame of the base and an elongate hollow spring collar or tube 40 spaced above pad 38 by spacer 42. Strengthening gusset plates 44 are provided on both sides of the spring supports. The longitudinal axis of collars or tubes 40 are aligned and extend along the adjacent side of the base.

Central spring support 36 includes a mounting plate 46, a spring collar or tube 48, like collars 40 and in axial alignment with collars 40, and a spacer 50 between the collar and pad. Pads 38 are below collars 40. Pad 46 is above collar 48. Support 36 includes supporting gusset plates 52, like gusset plates 44. Support 36 is located midway between supports 34 with each end of collar 48 spaced from the adjacent end of aligned collar 40 a distance 54. Tubes 40 and 48 are square in cross-section.

The end and central spring supports 34 and 36 are joined together by an elongate square cast polymeric spring body 56 extending the length of the spring unit. Body 56 includes a central passage 57 extending the length of the body. Central passage 57 permits circulation of air through body 56 to extract heat and counter heat build up in the polymeric material during operation of apparatus 10.

The spring units are each manufactured by mounting the pads 38 and 46, spacers 42 and 50 and gusset plates 44 and 52 on a single elongate length of square tube and then filling the center of the tube with polymeric material, leaving the central passage 57 clear. After the polymeric material has cured to form body 56, portions of the tube surrounding the polymeric material are cut away to form exposed spring beams 58 extending between collars 40 and 48. Body 56 extends through the length of the collars and is joined to the collars so that each spring unit comprises a horizontal beam spring extending between collars 40 and through collar 48. The length of the exposed beams, distance 54, is adjusted to yield a desired spring frequency for the mass/spring system, as will be described below. Body 56 is preferably formed from polymeric material, but may be formed from other stiffly flexible materials including plastic, rubber, or metallic spring materials, provided the material has the desired spring properties required for operation of the apparatus 10.

With the four spring units 32 mounted on the top of base 12 the mounting pads 46 of the center spring supports is face up in a square above the base surrounding vessel 16. Four downwardly facing support pads 60 on vessel 16 are mounted on pads 46 to support the vessel, drive spring assembly 18 and vibrator drive 20 on base 12 through the four spring units 32 of isolation spring assembly 14. Pads 60 are located on a center of the sides of a square lower frame 62 on the vessel 16. If desired, the spring units 32 may be mounted with pads 38 facing up and pads 40 facing down.

Square frame 64 is mounted on the top of vessel 16 and includes a pair of upwardly facing mounting pads 66 adjacent to the ends of each side of the frame. The drive spring assembly 18 at the top of the vessel includes four spring units 68, like spring units 32 shown in FIG. 12. The spring units 68 are mounted on the sides of frame 64 with the mounting pads on the end spring supports secured to mounting pads 66 and the four mounting pads on the center spring support arranged in a square and facing upwardly. These pads are secured to four mounting pads 70 mounted on the bottom of a square frame 72 on the bottom of vibrator drive 20 so that the vibrator drive is supported on the top of the vessel by the four beam spring units 68. The length of the beams exposed between the end and center supports of spring units 68 is adjusted to a desired frequency as described below. If desired, the spring units 68 may be mounted with end pads facing up and the center pads facing down.

Vessel 16 includes an upper portion 74, a middle cylindrical portion 76, a lower conical portion 78, and a surrounding frame 80. Upper portion 74 extends vertically a short distance upward from an upper flange 82 then narrows to an upper discharge outlet 84. Middle portion 76 extends downward from upper flange 82 to a lower flange 86. Lower portion 78 extends vertically a short distance downward from lower flange 86, then gradually narrows to a lower discharge outlet 88.

Lower portion 78 includes four intake inlets 90 spaced 90° apart around the circumference of portion 78 adjacent flange 86. Portion 78 includes three probe inlets 92, 94 and 96 spaced vertically along the circumference of portion 78 below an inlet 90.

Vibrator drive 20 includes rectangular frame 98 mounted above frame 72, a pair of rotary vibrators 23 and 24 mounted on opposite outer sides of frame 98 and a pair of vibration tuning plates 100 and 102 mounted on top of frame 98.

Rotary electric vibrators 23 and 24 are mounted on opposed sides of frame 98 and each includes an electric drive motor having eccentric weights mounted on opposed ends on the armature shaft. The motors are counter rotated at the same speed so that the weights approach the twelve o'clock and six o'clock positions together but are opposed at the three o'clock and nine o'clock positions. Horizontal forces produced by one vibrator are in this way canceled by the horizontal forces produced by the other vibrator. Vertical forces produced by both vibrators are added and transmitted to the vessel 16 through the four beam springs in drive spring assembly 18. The two counter rotating rotary vibrators both are mounted on rigid frame 98 and synchronize themselves automatically.

Tuning plates 100 and 102 are mounted on top of opposite sides of frame 98, between vibrators 23 and 24. Weights are added, if necessary, to adjust the mass of drive 20 for efficient vibration of vessel 16. The proper transmission of forces and resulting displacement are functions of the relationship between driver frequency and natural frequency of the mass/spring system. The vibrator drive 20 operates at a fixed frequency. The mass of the system is changed to adjust the natural frequency of the system. The mass of the system is changed by adding weights to turning plates 100 and 102.

The vibrator drive 20 preferably includes an acceleration switch mounted on frame 98. The switch senses horizontal vibration of the drive and shuts down the vibrators and actuates an indicator light when horizontal vibration is sensed. Horizontal vibration is most likely caused by failure of one of the vibrators 23, 24 while the other vibrator continues operating.

The length of the beam springs of the spring units in drive spring assembly 18 are tuned to a resonate frequency which is approximately 10% greater than the drive frequency of vibrators 23 and 24. The addition or subtraction of tuning weights is used to fine tune the natural frequency of the mass/spring system. The vibrators are driven at a speed of about 3,600 RPM and the beam springs in assembly 18 are tuned to a resonant frequency of about 3,950 to 4,000 cycles per minute, resulting in a tuned vibratory drive operating in a sub-resonate range. The tuned vibratory drive multiplies the vertical force and displacement of drive 20 by vibrators 23 and 24.

The isolation spring units 32 mounted between vessel 16 and base 12 have a natural resonant frequency tuned to the total weight of the vessel 16 and supporting framing, the slurry, sludge and clean water in the vessel, the rotary valve and the portions of the spring units in assemblies 14 and 18 attached directly to the vessel. The length of the isolation springs is selected to yield a natural frequency for this mass which is less than approximately 7/10 (0.70) the frequency of vibrator drive 20. The isolation springs reduce the force transmitted through the base to the support structure or the floor.

Figure 11:
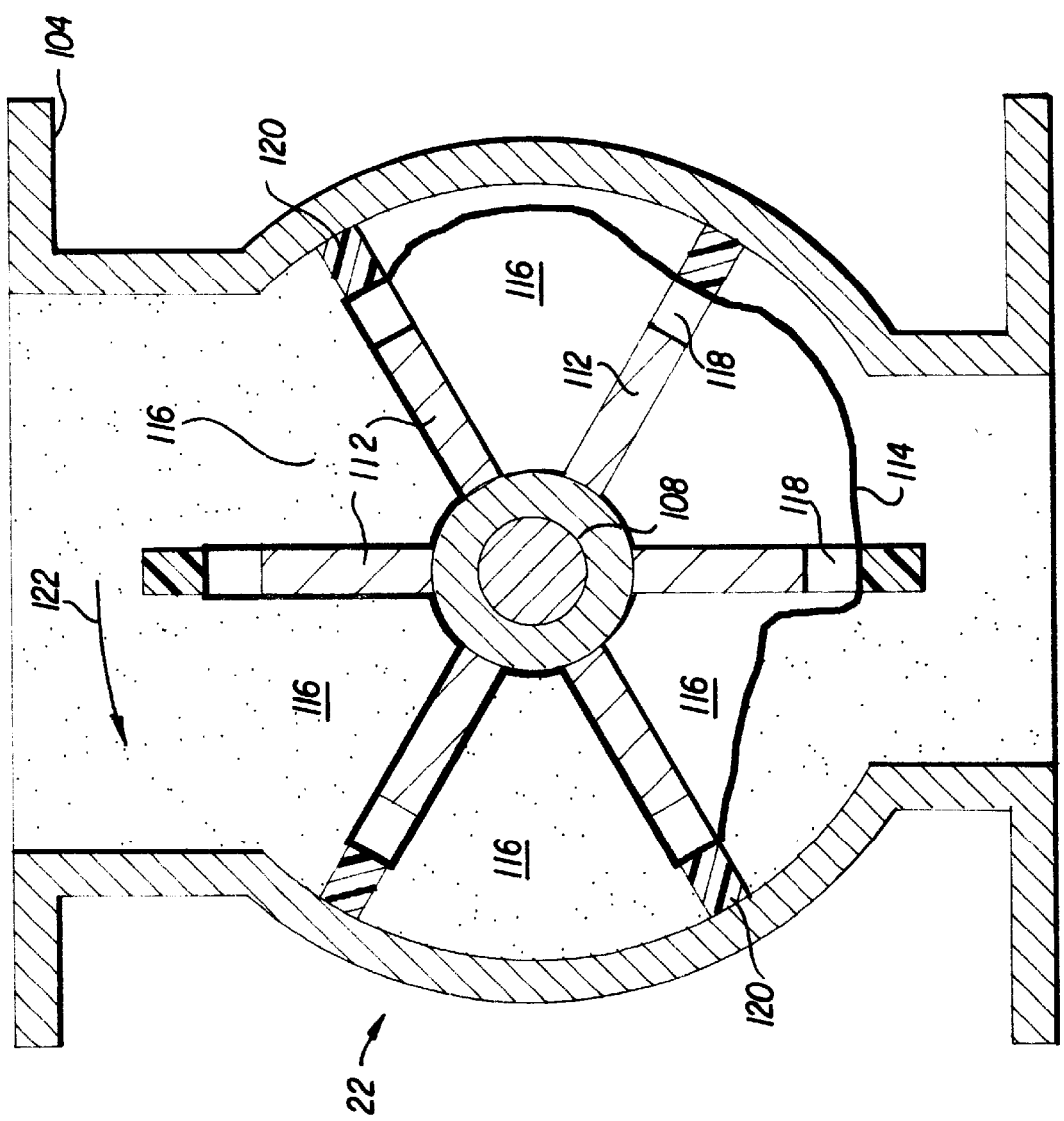
FIG. 11 is a sectional view of a rotary valve according to the invention.

As shown in FIG. 11, the rotary valve 22 includes a flange 104 joined to the bottom of lower portion 78, a horizontally extending cylindrical housing 106 below flange 104, a shaft 108 extending through the housing with ends rotatably mounted on the sides of housing 106 and a shaft drive motor 110 joined to one end of shaft 108. Shaft motor 110 rotates shaft 108 in housing 106.

Shaft 108 carries six vanes 112 spaced around shaft 108 within housing 106 and a flexible rubber diaphragm 114 surrounding vanes 112. Adjacent vanes 112 define pockets 116. Each vane 112 includes a passage through its thickness 118 that allows air to circulate between pockets 116. Diaphragm 114 is loosely secured to outer ends of vanes 112 by caps 120. The diaphragm 114 is also secured to end caps of the rotor which are attached to the vertical edges of the vanes. Diaphragm 114 overlies the pockets and is sufficiently flexible to fill the pockets and rest on the vanes and shaft as shown in the upper portion of FIG. 11 and to fall out from the pockets as shown in the lower portion of FIG. 11.

FIGS. 15 and 16 illustrate spring units according to a second embodiment. The second embodiment includes isolation spring assembly 130 similar to isolation spring assembly 14 of the first embodiment and a drive spring assembly similar to assembly 130. Assembly 130 is mounted on top of base 12 supporting and extending vertically below vessel 16. Isolation spring assembly 130 includes four isolation spring units 132, each mounted above one side of upper frame 30 and extending between adjacent corners. Each spring unit 132, according to the second embodiment, includes a pair of spaced apart end spring supports 134 and a central spring support 136 located between supports 134. Each support 134 engages a complimentary mounting plate on upper frame 30. Central spring support 136 engages a complimentary mounting support pad 60 on lower frame 62.

The end supports 134 and central supports 136 are joined together by a pair of elongate square polymeric spring bodies 138 extending parallel to each other along the length of the spring unit 132. End supports 134 are joined to the same side of bodies 138 and central support 136 is joined to an opposed side of bodies 138.

Each body 138 includes an elongate square tube or rod 140 preferably made of a stiffly flexible polymeric material extending between end spring supports 134. Tube 140 includes a hollow central passage 142 extending the length of tube 140. Each passage 142 permits the free circulation of air through a tube 140. In addition, each body 138 is spaced from the other to allow circulation of air between tubes 140. The circulation of air reduces heat build up in the polymeric material. Embedded within the polymeric material of each body 138 are two spaced apart end collars 144 adjacent ends of tube 140 and a central support collar 146. Central support collar 146 is located within the polymeric material of tube 140 and spaced between end collars 144.

End collars 144 are joined directly to end spring supports 134 and central collars 146 are joined directly to central support 136. The polymeric material of tube 140 is removed so that the collars are joined directly to the support.

Central collar 146 is spaced a distance 148 from each end collar 144. Tubes 140 have an outside dimension of distance 150 and an inner dimension 152 defining central passage 142.

The drive spring assembly according to the second embodiment (not illustrated) is similar in construction to isolation spring assembly 130 including four drive spring units similar to units 132. The differences in the construction of the assemblies resides in different distances 148, 150 and 152.

The operation of the waste water settling apparatus 10 will now be described. Waste water containing solids in suspension is fed into settling apparatus 10 through downwardly facing intake inlets 90 to fill the entire vessel 16 from lower portion 78 up to upper discharge outlet 84. Upper discharge outlet 84 includes a pressure sensor for sensing the pressure within the closed vessel 16. When the vessel 16 has been completely filled with waste water, the pressure in the vessel 16 is maintained at a suitable level. The pressure is detected by a pressure sensing device. Suitable pressures range from 5 to 50 pounds per square inch depending on the application, with the typical operating pressure being about 10 pounds per square inch.

When the vessel 16 is completely filled, vibrator drive 20 is activated. Vibrator drive 20 imparts a vertical, straight line force that is transmitted to the vessel 16 through drive spring assembly 18. The vertical force is generated by vertical movement of frame 98. Vibrators 23 and 24 provide a straight line oscillating force that vertically moves vibrators 23 and 24 and drive frame 98. Drive frame 98 provides a drive mass for vibrators 23 and 24 to act upon. The drive frame 98 typically has a drive mass, including the weight of vibrators 23 and 24, of about 550 pounds for a 3,000 pound, 100 gallon system. The weight of the drive mass will vary significantly on various size units.

Vibrator drive 20 operates at a drive frequency of approximately 3,600 cycles per minute with frame 98 having a typical displacement stroke of 0.060 to 0.090 inches and a total vertical stroke of 0.120 to 0.180 inches, depending on drive mass. This configuration is sufficient to impart a displacement stroke of approximately 0.024 inches (total stroke is approximately 0.048 inches) to the vessel 16 through the tuned drive spring assembly. The total mass vibrated by the vibrator drive may be approximately 3,000 pounds including approximately 100 gallons of waste water. It is contemplated that units for commercial application may range in mass between 5,000 pounds and 8,000 pounds or larger and have a capacity of from approximately 250 gallons to approximately 500 gallons of waste water.

Drive spring assembly 18 operates at a drive spring frequency at approximately 110 to 120 percent of the drive frequency. For a 3,000 pound system, the drive spring frequency is approximately 4,100 cycles per minute. The drive spring frequency may range between approximately 3,960 and 4,320 cycles per minute with satisfactory vibratory force transmitted to the vessel 16.

According to the first embodiment, the spring beams 58 are preferably formed from two inch square polymeric material. In order to obtain a desired drive spring frequency of approximately 4,100 cycles per minute for the system, the distance 54 of the beams between adjacent collars of spring unit 68 is approximately 1¾ inches. The shorter the distance 54, the higher the frequency of the spring. The distance 54 of isolation spring units 32 is approximately 2 inches.

According to the second embodiment, supports 134 and 136 are preferably 4 inch long, ½ inch think steel blocks. The tubes 140 are preferably polymeric material.

For the 3,000 pound system described above, the distance 148 between central collar 146 and each end collar 144 is approximately 4.50 inches for the isolation spring units 132 and approximately 5.00 inches for the drive spring units. The outside dimension 150 is approximately 2.25 inches for the isolation spring unit 132 and approximately 3.25 inches for the drive spring units. The inside dimension 152 is approximately 1.25 inches for the isolation spring units 132 and approximately 2.25 inches for the drive spring units. The overall length of tube 140 is approximately 21 inches for the isolation spring units 132 and approximately 22 inches for the drive spring units.

The closeness of the spring frequency of assembly 18 to the drive frequency causes the vertical force transmitted from the vibrator drive 20 through drive spring 18 to be amplified, with the increase in transmitted force resulting from the near resonant spring frequency. This increased vertical force permits desired vertical vibration of the vessel using relatively small vibrators. While a vibrator drive mounted directly on the vessel could be used, such an arraignment would cause what is known as a "hard" start. A "hard" start occurs when the vertical force of the vibrator drive is immediately transferred to vessel 16 upon actuation of the drive. "Hard" starts stress the structure and requires a larger initial force to start the system. Use of the drive spring assembly provides the added benefit of a "soft" start. "Soft" starts are beneficial because the vertical force applied to vessel 16 upon start-up gradually builds as the drive spring assembly 18 nears the drive spring frequency.

The waste water is fed into vessel 16 from a clarifier and typically consists of 30% solids and 70% water. However, waste water consisting of a lower solids content can be fed to vessel 16. The solids are typically particles of various sizes suspended in the water. Due to the difference in the specific gravity between the water and the solid particles, gravity causes the particles to settle to the bottom. In the system described above with a drive frequency of approximately 3,600 cycles per minute, apparatus 10 moves the water and particles up and down and imparts a vertical downward force approximately six times the force of gravity on the fluid in the vessel at the bottom of the downward stroke and a vertical upward force approximately four times the force of gravity at the top of the stroke. The downward force is two gravities greater than the upward force. The difference in force is due to gravity being additive at the bottom stroke reversal and subtractive at the top stroke reversal.

As the vertical forces are applied to vessel 16 and contents, the waste water in vessel 16 rises and solids are driven down against lower portion 52. The downward vertical force separates the solids from the water and imparts a larger momentum to the solids. As the solids collect at the bottom of vessel 16, water is forced up through the solids. During the following upward stroke, the solids are separated slightly creating minuscule channels therein. These channels provide avenues for the water to rise through and above the solids as the solids are compacted upon the next stroke reversal. Continuous operation of the apparatus compacts the solids in the bottom of vessel 16 above lower discharge outlet 88.

Solids collect at the bottom of vessel 16 above rotary valve 22 and fill the pockets 116 opening up into the vessel. The weight of the solids holds the diaphragm 114 against vanes 112. Shaft drive motor 110 rotates shaft 108 in the direction of arrow 122 shown in FIG. 11 to rotate pockets 116 filled with solids away from the outlet 88 at the bottom of vessel 16 and down to discharge passage 124 at the bottom of housing 106. As the vanes are rotated solids in filled pockets 116 fall down out of the pockets and into discharge passage 124. Vanes located in the inlet passage 126 at the top of housing 106 are swept into contact with the walls of the housing so that caps 120 engage the housing walls and vanes on the opposite side of the housing are rotated up into passage 126 and out of contact with the walls of the housing. At all times two vanes located on opposite sides of shaft 108 are in contact with the walls of the housing to prevent leakage of water through the valve.

As shaft 108 is rotated, the diaphragm in the pocket at the bottom of the housing falls down to assure ejection of all the solids collected in the pocket. Continued rotation back up to passage 126 positions the diaphragm back in its appropriate pocket to receive further solids collected at the bottom of the vessel and flowed down into the passage 126.

During movement of membranes into and out of pockets 116 the air confined between the membranes and the interior of the pockets is flowed to adjacent pockets through passages 118 extending through the vanes. These passages assure that bubbles do not form in the vanes which would reduce the capacity of the rotary valve to discharge collected solids.

The rotary valve 22 permits controlled discharge of collected solids at the bottom of vessel 16 without appreciable discharge of water from the vessel and while maintaining the pressure head of the water in the vessel.

Preferred opposed electric rotary vibrators 23 and 24 may be replaced by one or more other vertical vibrators including linear electromagnetic vibrators, eccentric crank drives or eccentric weight shaft drives. The vibrator or vibrators driven by one or separate electric motors mounted away from the apparatus and connected to the apparatus by a belt, chain, or drive shaft arrangement. Horizontal beam springs are disclosed. Other types of springs may be used. The embedded collars of the second embodiment spring collars are disclosed having slightly rounded edges. The edges may be rounded or chamfered as necessary to decrease any sheering effect.

While I have illustrated and described a preferred embodiment of my invention, it is understood that this is capable of modification, and I therefore do not wish to be limited to the precise details set forth, but desire to avail myself of such changes and alterations as fall within the purview of the following claims.

What I claim as my invention is:

1. A waste water settling apparatus for removing solids from waste water, comprising:

a base;

an isolation spring assembly mounted on said base;

a closed cylindrical vessel supported on and extending vertically above said isolation spring assembly; said vessel having an upper portion and a lower portion;

at least one intake inlet in said vessel;

a lower solids discharge outlet in said vessel at said lower portion;

an upper water discharge outlet in said vessel at said upper portion;

a drive spring assembly joined to said vessel; and a vibrator mounted on said drive spring assembly operable to vibrate said vessel vertically.

2. The apparatus as claimed in claim 1 wherein said lower discharge outlet includes a rotary valve having a rotatable shaft extending across said lower discharge outlet, a plurality of spaced vanes extending from said shaft, and a diaphragm surrounding said plurality of vanes.

3. The apparatus as claimed in claim 1 wherein said drive spring assembly is joined to said upper portion.

4. The apparatus as claimed in claim 3 wherein both said spring assemblies includes a plurality of spring units.

5. The apparatus as claimed in claim 4 wherein each of said spring units includes an elongate spring body, two end supports spaced apart on one side of said spring body and engaging the ends of the body, and a central support on the other side of said spring body engaging the body between said end supports.

6. The apparatus as claimed in claim 5 wherein said spring body is made from a polymeric material.

7. The apparatus as claimed in claim 6 wherein each of said supports includes a collar and a spacer, said collars surrounding said spring body and said spacers joined to said collars and extending away from said spring body.

8. The apparatus as claimed in claim 7 wherein said vibrator includes a drive mass joined to said drive spring assembly and two rotary vibrators mounted on opposed sides of said drive mass.

9. The apparatus as claimed in claim 8 wherein said at least one intake inlet includes a plurality of intake inlets spaced around a circumference of said vessel.

10. The apparatus as claimed in claim 4 wherein each of said spring units includes a pair of elongate spring bodies, two end supports spaced apart along one side of said pair of spring bodies, and a central support on the other side of said pair of spring bodies between said end supports.

11. A settling apparatus for settling and densifying solids suspended in waste water, the apparatus comprising:

a closed vessel having an upper outlet, a lower outlet and at least one inlet;

a vibrator on said vessel;

a base supporting said vessel;

a vertical vibration isolation spring assembly mounted between said vessel and said base; and a vertical vibration drive spring assembly mounted between said vessel and said vibrator.

12. The apparatus as claimed in claim 11 wherein said lower outlet includes a valve operable to discharge compacted solids without discharging appreciable water.

13. The apparatus as claimed in claim 12 wherein said isolation spring assembly and said drive spring assembly each include a plurality of spring units.

14. The apparatus as claimed in claim 13 wherein each of said spring units includes an elongate generally horizontal spring body, two end supports joined to the ends of the body and spaced apart along one side of said spring body, and a central support joined to the body between said end supports on the other side of said spring body.

15. The apparatus as claimed in claim 13 wherein each of said spring units includes a pair of elongate spring bodies, two end supports spaced apart on one side of said pair of spring bodies, and a central support on the other side of said pair of spring bodies between said end supports.

16. A settling apparatus for settling and densifying solids suspended in waste water, the apparatus comprising:

a generally vertically disposed closed vessel having an upper end and a lower end, an upper outlet at said upper end, a lower outlet at said lower end, and at least one inlet disposed at an intermediate portion of said vessel between said upper outlet and said lower outlet, a vibrator connected to said vessel and including a pair of generally horizontally disposed eccentrically weighted shafts which are counter rotated at the same speed so that the horizontal forces produced by one shaft are substantially canceled by the horizontal forces of the other shaft, while the vertical forces produced by both shafts are added to another to provide vertical vibration of the vessel with substantially no horizontal vibration of the vessel, a base supporting said vessel; and a vertical vibration isolation spring assembly mounted between said vessel and said base.

* * * * *